United States Patent
Kagan et al.

(10) Patent No.: US 6,735,642 B2
(45) Date of Patent: May 11, 2004

(54) DMA DOORBELL

(75) Inventors: Michael Kagan, Zichron Yaakov (IL); Ariel Shahar, Haifa (IL); Diego Crupnicoff, Haifa (IL)

(73) Assignee: Mellanox Technologies Ltd., Yokneam (IL)

( * ) Notice: Subject to any disclaimer, the term of this patent is extended or adjusted under 35 U.S.C. 154(b) by 352 days.

(21) Appl. No.: 09/870,016

(22) Filed: May 31, 2001

(65) Prior Publication Data

US 2001/0049755 A1 Dec. 6, 2001

Related U.S. Application Data

(60) Provisional application No. 60/209,163, filed on Jun. 2, 2000.

(51) Int. Cl.[7] .............................................. G06F 13/14
(52) U.S. Cl. .............................. 710/24; 710/22; 710/23; 710/52
(58) Field of Search .............................. 710/22, 23, 24, 710/52

(56) References Cited

U.S. PATENT DOCUMENTS

| | | | |
|---|---|---|---|
| 5,713,044 A | | 1/1998 | Gillespie et al. |
| 5,862,407 A | * | 1/1999 | Sriti ............................. 710/23 |
| 5,991,797 A | * | 11/1999 | Futral et al. ................. 709/216 |
| 6,098,121 A | * | 8/2000 | Furuya ......................... 710/24 |
| 6,134,648 A | * | 10/2000 | Peterson et al. .............. 712/41 |
| 6,199,121 B1 | * | 3/2001 | Olson et al. .................. 710/24 |

* cited by examiner

*Primary Examiner*—A. Elamin
(74) *Attorney, Agent, or Firm*—Mark M. Friedman (57) ABSTRACT

A method of direct memory access (DMA) includes receiving a first notification at a DMA engine that a first list of descriptors has been prepared, each of the descriptors in the list including an instruction for execution by the DMA engine and a link to a succeeding one of the descriptors, except for a final descriptor in the list, which has a null link. The DMA engine reads and executes the descriptors in the first list. When the DMA engine receives a second notification that a second list of the descriptors has been prepared, it rereads at least a part of the final descriptor in the first list to determine a changed value of the link, indicating a first descriptor in the second list. It then reads and executes the descriptors in the second list responsive to the changed value of the link.

35 Claims, 3 Drawing Sheets

| OPCODE | SOURCE ADDRESS | DEST. ADDRESS | NEXT | STATUS |
|--------|---------------|---------------|----------|--------|
| SEND | ABCD1234 | 5678DCBA | 90ABCD12 | 1 |
| RDMA | ... | ... | 34567891 | 1 |
| ... | ... | ... | 0ABCD012 | 1 |
| ... | ... | ... | 00000000 | 2 |

DMA DOORBELL

CROSS-REFERENCE TO RELATED APPLICATIONS

This application claims the benefit of U.S. Provisional Patent Application No. 60/209,163, filed Jun. 2, 2000, which is incorporated herein by reference.

FIELD OF THE INVENTION

The present invention relates generally to computer systems, and specifically to devices and methods for direct memory access (DMA) in such systems.

BACKGROUND OF THE INVENTION

Direct memory access (DMA) is an efficient means for transferring data to and from a memory without direct involvement of a central processing unit (CPU). A DMA engine performs the desired data transfer operations as specified by DMA commands, known as descriptors. The descriptors typically indicate, for each operation, a source address from which to read the data, and a destination address to which the data are to be written. The descriptors are commonly organized in memory as a linked list, or chain, in which each descriptor contains a field indicating the address in the memory of the next descriptor to be executed. The last descriptor in the list has a null pointer in the "next descriptor" field, indicating to the DMA engine that there are no more commands to be executed, and DMA should become idle once it has reached the end of the chain.

In order to initiate a chain of DMA data transfers, an application program running on a CPU prepares the appropriate chain of descriptors in a memory accessible to the DMA engine. The CPU then sends a message to the DMA engine indicating the memory address of the first descriptor in the chain, which is a request to the DMA engine to start execution of the descriptors. The application typically sends the message to the "doorbell" of the DMA engine—a control register with a certain bus address that is specified for this purpose. Sending such a message to initiate DMA execution is known as "ringing the doorbell" of the DMA engine. The DMA engine responds by reading and executing the first descriptor. It then updates a status field of the descriptor to indicate to the application that the descriptor has been executed. The engine follows the "next" field through the entire linked list, marking each descriptor as executed, until it reaches the null pointer in the last descriptor. After executing the last descriptor, the DMA engine becomes idle and is ready to receive a new list for execution.

While the DMA engine is executing one chain, the application program may prepare a new chain for execution. This situation occurs frequently in computer network applications, in which DMA is used to transfer newly-arrived data from an incoming connection, such as an Ethernet link, to the computer's local memory, or from the memory to an outgoing connection. When the new chain is ready, the program can, in principle, link it to the previous chain, which is already in execution by the DMA engine, by modifying the "next" field in the last descriptor of the previous chain so that it points to the first descriptor in the new chain. The problem with this approach is that by the time the application has updated the "next" field of the last descriptor, the DMA engine may have already read this descriptor. (This case is particularly likely to occur in modern DMA engines, which use pipeline architectures to pre-fetch, read and process multiple descriptors at once.) In such a case, the DMA engine will not notice that the last descriptor has been updated, and it will therefore simply go idle after executing this last descriptor without reading the first descriptor in the new chain.

In order to avoid such a situation, the application program must generally synchronize its operation with the DMA engine each time it submits (or appends) a new chain of descriptors. One approach to synchronization is for the program to wait until the DMA engine has become idle before ringing its doorbell to notify it of the new chain. For example, the program may check periodically to determine when the DMA engine has flagged the last descriptor in the previous chain as having been executed as a sign that the engine is idle. The program must make sure that the engine has actually become idle before it rings the doorbell again, because of the inherent limitations of the doorbell as a hardware resource. If the doorbell rings before the previous chain has finished executing, the DMA engine will presumably ignore it. An explicit synchronization mechanism is typically needed in order to avoid this situation, since the application software typically prepares new descriptors at a pace that is different from the rate of execution of the descriptors by the DMA engine.

As an addition possibility, the program may check the earlier descriptors in the previous chain to see when they are flagged, so as to judge how far the DMA engine may be from the end of the chain. If the engine is far from the end of the chain, the program will presumably have time to update the "next" field of the last descriptor before it is read by the DMA engine. This approach is risky, however, in view of the pre-fetch and pipelining capabilities of advanced DMA engines mentioned above. It also requires that the same software process be used both to create the descriptor lists and to track their completion status.

Thus, there is inherent inefficiency in the design of DMA engines known in the art. The possible synchronization processes described above are time-consuming and add overhead to application program operations. Furthermore, waiting for the DMA engine to become idle requires that the DMA pipeline be flushed, which wastes DMA resources and impacts negatively on its performance. In order to minimize the relative burden of synchronization overhead, the application software can be made to prepare longer lists of descriptors before ringing the doorbell. This approach, however, has the added disadvantage of increasing the latency of data transfer service.

SUMMARY OF THE INVENTION

It is an object of the present invention to provide improved methods and devices for direct memory access (DMA).

It is a further object of some aspects of the present invention to provide an improved DMA doorbell mechanism.

In preferred embodiments of the present invention, a DMA engine is provided with a doorbell whose resources are substantially unlimited, in the sense that the doorbell may be rung multiple times without loss of data and without executing the same descriptor multiple times. When an application program prepares a new chain of descriptors for execution by the DMA engine, it modifies the "next" field in the last descriptor of the preceding chain so as to point to the first descriptor in the new chain, and then it rings the doorbell. Whenever the doorbell is rung, the DMA engine sets a flag, or if the flag is already set, it leaves the flag unchanged. When the engine reaches the point of executing the last descriptor in its current chain, and it finds that the doorbell flag is set, the engine rereads the "next" field of the last descriptor in order to determine whether it has been changed to point to a new chain. Only when the "next" field still contains a null pointer upon rereading does the DMA engine go idle and clear the doorbell.

This new type of doorbell, as provided by preferred embodiments of the present invention, relieves the application software entirely of the need to synchronize its activities with the state of the DMA engine. It allows an existing chain of DMA descriptors to be extended reliably regardless of the state of the DMA engine itself. Thus, the performance of the software is improved, due to the elimination of synchronization overhead. The performance of the DMA engine is enhanced, as well, since there is never a need to wait for the engine to go idle before starting a new chain of descriptors. As a result, the latency of DMA service is minimized.

Although preferred embodiments are described herein with reference to DMA operations, the principles of the present invention may be extended to the more general case of synchronizing between processes of other types. These principles are applicable, for example, in situations in which a first process prepares a worklist for second process, and then rings a doorbell to alert the second process. Based on the doorbell mechanism of the present invention, the first process may extend the worklist arbitrarily, with the assurance that when the second process reaches the end of the worklist, it will look again at the last command before going idle.

There is therefore provided, in accordance with a preferred embodiment of the present invention, a method of direct memory access (DMA), including:

receiving a first notification at a DMA engine that a first list of descriptors has been prepared, each of the descriptors in the list including an instruction for execution by the DMA engine and a link to a succeeding one of the descriptors, except for a final descriptor in the list, which has a null link;

reading and executing the descriptors in the first list using the DMA engine;

receiving a second notification at the DMA engine that a second list of the descriptors has been prepared;

rereading at least a part of the final descriptor in the first list to determine a changed value of the link, indicating to the DMA engine a first descriptor in the second list; and reading and executing the descriptors in the second list using the DMA engine responsive to the changed value of the link.

Preferably, receiving the first and second notifications includes receiving the notifications that the first and second lists have been stored at respective addresses in a memory, and reading the descriptors includes reading the descriptors from the memory. Further preferably, executing the descriptors includes marking each of the descriptors as having been executed after executing each of the descriptors, and marking each of the descriptors includes marking the final descriptor in a manner that is distinctive from the marking of the other descriptors. Most preferably, the method includes reclaiming the addresses in the memory responsive to the marking of each of the descriptors, so as to permit reallocation of the addresses, while preserving the final descriptor from being reclaimed responsive to its distinctive marking.

Additionally or alternatively, the link in each of the descriptors includes a pointer to the address of the succeeding one of the descriptors, and receiving the second notification includes receiving the second notification after the value of the null link has been changed to include a pointer to the first descriptor in the second list.

Further additionally or alternatively, receiving the second notification includes receiving the second notification while the DMA engine is executing the descriptors in the first list, and reading and executing the descriptors in the second list includes reading and executing the descriptors responsive to the notification after the DMA engine has finished executing the descriptors in the first list. Preferably, receiving the first notification includes receiving a first data input to a command register of the DMA engine and setting a flag in response to the first data input, responsive to which flag the DMA engine reads and executes the descriptors, and receiving the second notification includes leaving the flag set as long as the DMA engine is executing the descriptors.

In a preferred embodiment, receiving the second notification includes receiving the second notification after the DMA engine has finished executing the descriptors in the first list, and rereading at least the part of the final descriptor includes rereading at least the part of the final descriptor after the final descriptor has been executed.

Typically, reading and executing the descriptors includes at least one of conveying data from a data source to a memory and conveying data from a memory to a data target. In a preferred embodiment, receiving the first and second notifications includes receiving the notifications submitted by a program running on a central processing unit (CPU), which has prepared the lists of descriptors, while conveying the data includes transmitting the data using the DMA engine substantially without intervention of the CPU in conveying the data. Preferably, receiving the second notification includes receiving the notifications submitted by the program substantially irrespective of an execution state of the DMA engine.

There is also provided, in accordance with a preferred embodiment of the present invention, a method of direct memory access (DMA), including:

preparing a first list of descriptors for execution by a DMA engine, each of the descriptors in the list including an instruction for execution by the DMA engine and a link to a succeeding one of the descriptors, except for a final descriptor in the list, which has a null link;

submitting a first notification to the DMA engine that the first list has been prepared, so that the DMA engine will execute the descriptors in the first list responsive to the first notification;

preparing a second list of the descriptors for execution by the DMA engine;

modifying the link in the final descriptor in the first list so as to indicate a first descriptor in the second list;

submitting a second notification to the DMA engine that the second list has been prepared, so that the DMA engine will execute the descriptors in the second list responsive to the second notification, substantially irrespective of an execution state of the DMA engine when it receives the second notification.

Preferably, submitting the second notification includes causing the DMA engine to reread at least a portion of the final descriptor in the first list so as to locate thereby the first descriptor in the second list.

Additionally or alternatively, preparing the first and second lists includes storing the lists at respective addresses in a memory, and submitting the first and second notifications includes notifying the DMA engine that it should read the descriptors from the memory. Preferably, the link in each of the descriptors includes a pointer to the address of the succeeding one of the descriptors, and modifying the link includes changing a value of the null link so as to include a pointer to the first descriptor in the second list.

Typically, submitting the second notification includes submitting the second notification while the DMA engine is executing the descriptors in the first list. Alternatively, submitting the second notification includes submitting the second notification after the DMA engine has finished executing the descriptors in the first list.

There is additionally provided, in accordance with a preferred embodiment of the present invention, apparatus for direct memory access (DMA), including a DMA engine, which is coupled to receive a first notification that a first list of descriptors has been prepared, each of the descriptors in the list including an instruction for execution by the DMA engine and a link to a succeeding one of the descriptors, except for a final descriptor in the list, which has a null link, and which is adapted to read and execute the descriptors in the first list, and which is further coupled to receive a second notification a second list of the descriptors has been prepared, and which is further adapted to reread at least a part of the final descriptor in the first list to determine a changed value of the link, indicating a first descriptor in the second list, and to read and execute the descriptors in the second list using the DMA engine responsive to the changed value of the link.

Preferably, the apparatus includes a memory, which is coupled to store the first and second lists, wherein the first and second notifications include notifications that the first and second lists have been stored at respective addresses in a memory, and wherein the DMA engine is coupled to read the descriptors from the memory. In a preferred embodiment, the apparatus includes a processor, which is coupled to reclaim the addresses of the descriptors in the memory responsive to the indication that the descriptors have been executed, so as to permit reallocation of the addresses, while preserving the final descriptor from being reclaimed responsive to its distinctive indication.

Preferably, the DMA engine includes a command register and flag, wherein the first notification includes a first data input to the command register, and wherein the second notification includes a second data input to the command register, and wherein the DMA engine is adapted to set the flag in response to the first data input, and to read and execute the descriptors responsive to the flag being set, leaving the flag set as long as the DMA engine is executing the descriptors.

Typically, in accordance with the descriptors, the DMA engine performs at least one of conveying data from a data source to a memory and conveying data from a memory to a data target. In a preferred embodiment, the apparatus includes a central processing unit (CPU), which is programmed to prepare the first and second lists of descriptors and to submit the first and second notifications, responsive to which the DMA engine is adapted to convey the data substantially without intervention of the CPU in conveying the data.

There is further provided, in accordance with a preferred embodiment of the present invention, apparatus for direct memory access (DMA), including:

a DMA engine, adapted to transfer data between a data target and a data source responsive to descriptors submitted thereto; and a descriptor processor, adapted to prepare a first list of the descriptors for execution by the DMA engine, each of the descriptors in the list including an instruction for execution by the DMA engine and a link to a succeeding one of the descriptors, except for a final descriptor in the list, which has a null link, and coupled to submit a first notification to the DMA engine that the first list has been prepared, so that the DMA engine will execute the descriptors in the first list responsive to the first notification, and which is further adapted to prepare a second list of the descriptors for execution by the DMA engine and to modify the link in the final descriptor in the first list so as to indicate a first descriptor in the second list, and which is further coupled to submit a second notification to the DMA engine that the second list has been prepared, causing the DMA engine to execute the descriptors in the second list responsive to the second notification, substantially irrespective of an execution state of the DMA engine when it receives the second notification.

The present invention will be more fully understood from the following detailed description of the preferred embodiments thereof, taken together with the drawings in which:

DETAILED DESCRIPTION OF PREFERRED EMBODIMENTS

Figure 1:
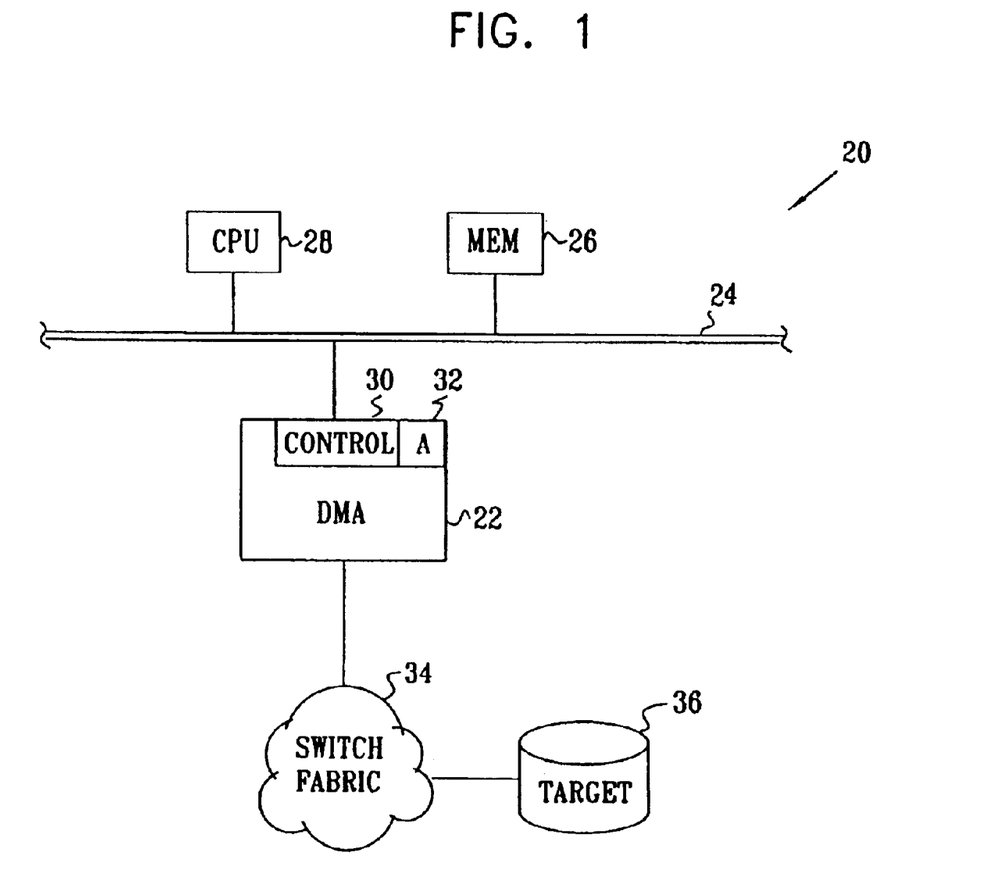
FIG. 1 is a block diagram that schematically illustrates a computer system with direct memory access (DMA), in accordance with a preferred embodiment of the present invention.

FIG. 1 is a block diagram that schematically illustrates a computer system 20 comprising a direct memory access (DMA) engine 22, in accordance with a preferred embodiment of the present invention. The DMA engine communicates over a bus 24 with a memory 26. In a typical application, the bus comprises a Peripheral Component Interface (PCI) bus, as is known in the art, and the memory comprises system random access memory (RAM), which is associated with a CPU 28 on the bus. Alternatively, however, the DMA engine may communicate with the memory over substantially any suitable type of data connection, whether parallel or serial.

A program running on CPU 28, typically an application software program, generates a chain of descriptors for execution by DMA engine 22. The CPU stores the descriptor chain in memory 26 and then notifies the DMA engine that the chain is ready for execution by ringing a doorbell of the engine. Preferably, the doorbell comprises a field in a control register 30 of the DMA engine having an address in the address space of bus 24. When the CPU first rings the doorbell after system initialization, it writes the address of the first descriptor in the chain to a "last executed" field in register 30. This is the field to which DMA engine 22 refers in order to find the next descriptor to execute in memory 26, as described in detail hereinbelow. Subsequently, the DMA engine updates the "last executed" field by itself.

Whenever the doorbell rings, the DMA engine sets a corresponding internal flag 32, and leaves the flag set as long as there are further descriptors in memory 26 to be executed by the engine. If the CPU (or any other component on the bus) rings the doorbell again while the DMA engine is still processing the descriptors in a previous chain, flag 32 is unaffected. In contrast to DMA engine 22, DMA doorbell mechanisms known in the art do not provide this ability to transparently handle repeated ringing of the doorbell while processing a descriptor chain. The structure of the DMA descriptor chain provided to DMA engine 22 and the operation of the DMA engine are described in greater detail hereinbelow.

While flag 32 is set, DMA engine 22 reads and executes the descriptors from memory 26. In the example shown in FIG. 1, the DMA engine interfaces between bus 24 and a switch fabric 34, through which the engine transfers data from memory 26 to a target device 36, such as a disk. Alternatively, the DMA engine could transfer data from the disk to the memory. In a preferred embodiment, the DMA is part of a Host Channel Adapter, used to interface between a PCI bus and an InfiniBand™ switching fabric. Alternatively, the DMA engine can be configured to transfer data between two parallel buses or between two serial switching fabrics or other data networks. Generally speaking, DMA engines implementing the principles of the present invention can be made to interface with buses, links and networks of substantially any type known in the art.

Figure 2:
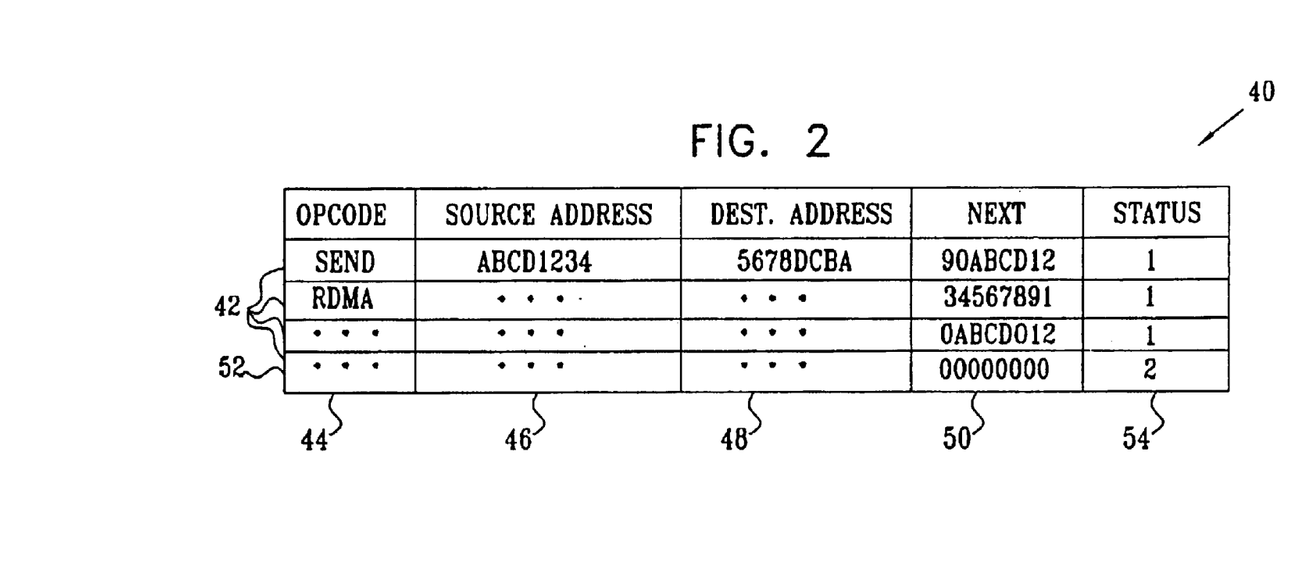
FIG. 2 is a table that schematically illustrates a data structure used by a DMA engine, in accordance with a preferred embodiment of the present invention.

FIG. 2 is a table that schematically illustrates a chain 40, or linked list, of DMA descriptors 42 prepared in memory 26 by a program running on CPU 28, in accordance with a preferred embodiment of the present invention. Each descriptor comprises information required by DMA engine 22 for execution, including:

- an operation code (OPCODE) 44 specifying the action to be carried out,
- a source address 46 (in memory 26 in the present example) from which the data are to be read,
- a destination address 48 (in target 36) to which the data are to be written, and
- a "next" pointer 50 to the address in memory 26 of the next descriptor.

In practice, the descriptors preferably comprise additional information, such as the data length, details of the operations to be carried out, channels for reading and writing of the data, and other control parameters. These additional elements, which are not of relevance to the principles of the present invention, are omitted from FIG. 2 for the sake of simplicity of illustration.

In each descriptor 42, "next" pointer 50 indicates the address at which the next descriptor in chain 40 is to be found in memory 26. In a final descriptor 52 in the chain, however, the "next" pointer is set to a null value, in this case 00000000. Upon reaching descriptor 52 and reading this null pointer, DMA engine 22 determines that it has reached the last entry in the chain.

Preferably, each descriptor 42 in chain 40 also includes a status field 54, which is updated by DMA engine 22 after it executes the descriptor. In the present example, unexecuted descriptors (not shown) have their status fields set to 0, and the DMA engine changes the status value to 1 after execution. For purposes of memory management, as described further hereinbelow, final descriptor 52 receives a special completion value in status field 54—the value 2 in this example—to distinguish it from the other, non-final descriptors.

Figure 3:
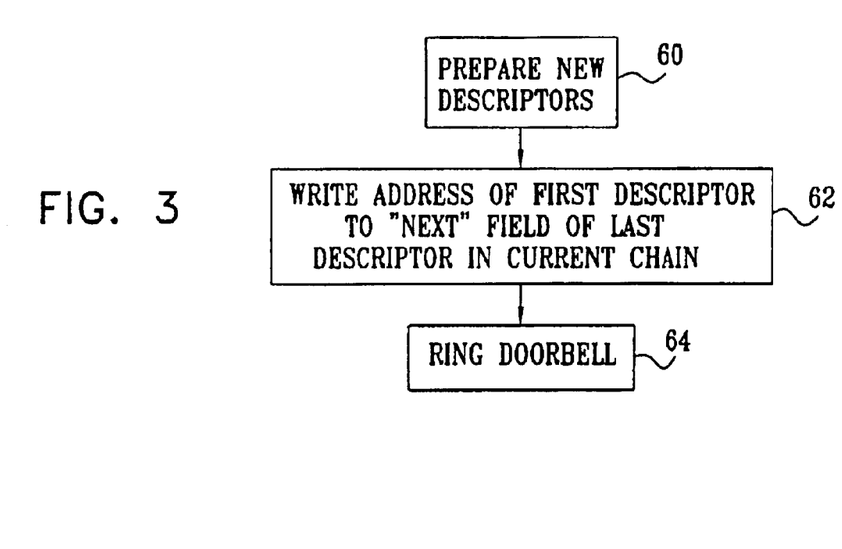
FIG. 3 is a flow chart that schematically illustrates a method for preparing a chain of descriptors for execution by a DMA engine, in accordance with a preferred embodiment of the present invention.

FIG. 3 is a flow chart that schematically illustrates a method by which CPU 28 prepares and links a new chain of descriptors to an earlier chain that was previously submitted to DMA engine 22 for execution. The new descriptor chain is written to memory 26, typically by application software running on the CPU, at a descriptor preparation step 60. To link the new chain to the earlier chain, CPU 28 rewrites pointer 50 in final descriptor 52 of the preceding chain so that it points to the first descriptor in the new chain. The CPU preferably links the first descriptor of the new chain to the last descriptor in the preceding chain even if the preceding chain has completed execution and is idle.

After modifying the "next" pointer in the last descriptor, the CPU rings the doorbell of the DMA engine, at a doorbell ringing step 64, by writing to the appropriate address in control register 30. In response to the doorbell, the DMA engine reads the pointer in final descriptor 52, and uses the rewritten pointer information to find the first descriptor in the new chain. Since each new chain relies for initiation on the "next" pointer in the last descriptor of the preceding chain, special provision must be made for the first chain submitted by the CPU when system 20 is started up. Preferably, for this purpose, the first descriptor in the first chain contains a null OPCODE 44, since all the first descriptor can do is to provide the pointer to the next descriptor. Alternatively, DMA engine 22 may comprise a conventional doorbell in addition to the doorbell in register 30. The conventional doorbell can be used for the first chain of descriptors submitted after system start-up and to restart DMA operations after other idle periods of the engine.

Figure 4:
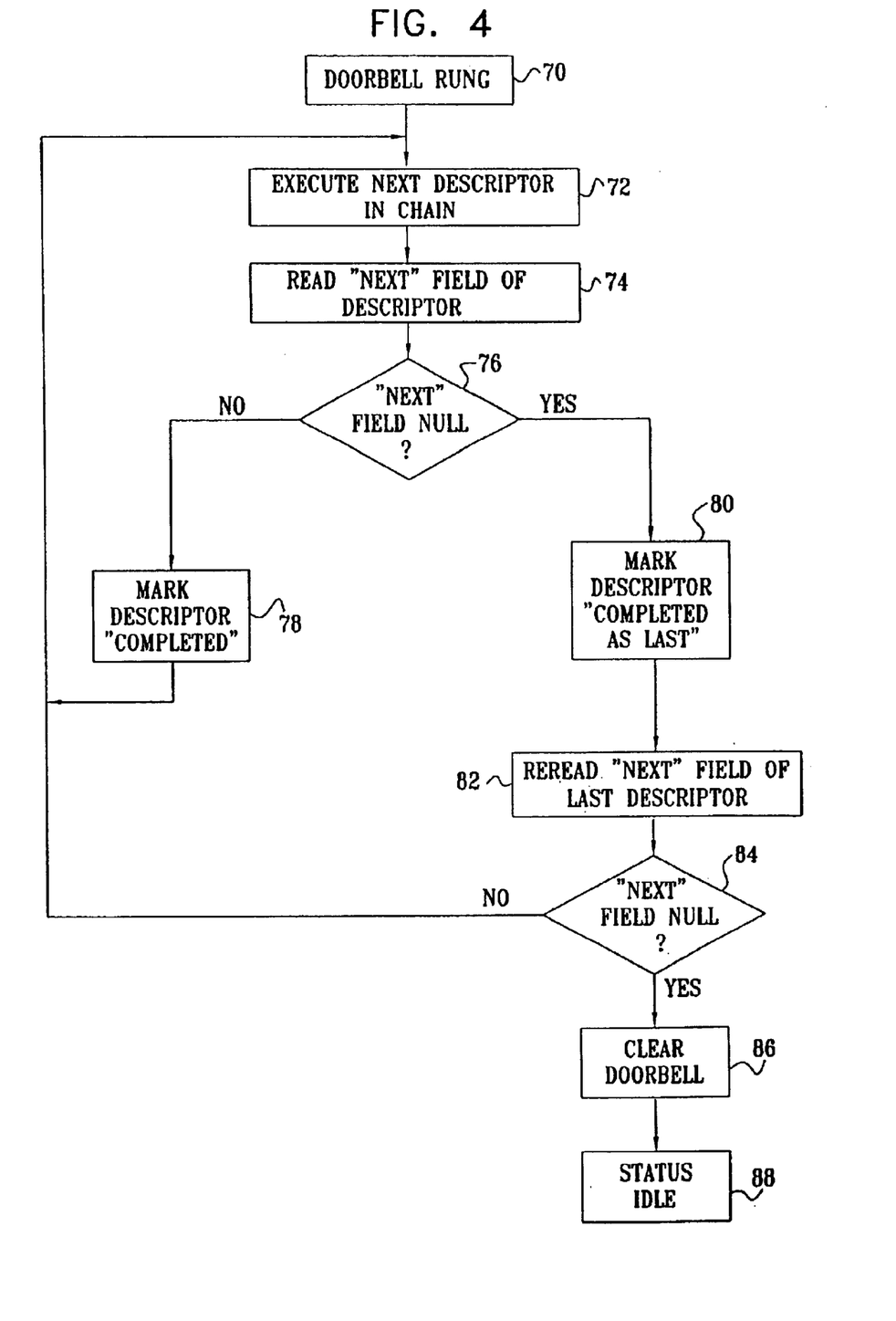
FIG. 4 is a flow chart that schematically illustrates a method for processing a chain of DMA descriptors, in accordance with a preferred embodiment of the present invention.

FIG. 4 is a flow chart that schematically illustrates handling of chain 40 by DMA engine 22, in accordance with a preferred embodiment of the present invention. The scenario of FIG. 4 assumes that CPU 28 has carried out the procedure of FIG. 3, including preparing a new chain of descriptors in memory 26 and ringing the doorbell in register 30 while engine 22 is busy executing a previous descriptor chain. Thus, flag 32 of the DMA engine may already be set, and remains set, at an initial doorbell ringing step 70 in FIG. 4.

Alternatively, the procedure of FIG. 4 is also applicable when the DMA engine is idle, so that flag 32 is reset at the time that the CPU rings the doorbell. As noted above, the first time the CPU rings the doorbell after system start-up, it also writes the address of the first descriptor (with the null OPCODE) to the "last executed" field in register 30. Subsequently, DMA engine 22 updates this field itself each time it executes a descriptor. Whenever the DMA engine is idle, and the doorbell is rung, the DMA engine refers to the "last executed" field in order to find the next descriptor in memory 26, and execution then continues as described below. Therefore, although DMA engine 22 may also have a conventional doorbell for launching new descriptor chains after idle periods, as described above, it is not necessary to the present invention that such a conventional doorbell be present or used.

DMA engine 22 reads each descriptor 42 in turn, and executes the descriptor at an execution step 72. Upon completion of execution, the DMA engine updates the "last executed" field in register 30 accordingly. The DMA engine reads "next" field 50 of each descriptor in order to find the next descriptor in the chain, at a pointer reading step 74. At a null determination step 76, the DMA engine evaluates field 50 to determine whether it contains a null value, as in last descriptor 52. If not, then after completing the execution of each descriptor, the DMA engine simply marks status field 54 of the descriptor as completed (status 1, in the example of FIG. 2), in a marking step 78, and goes on to repeat steps 72 through 76 for the next descriptor in the chain. Once a given descriptor is marked as completed in this manner, a memory management routine operating on memory 26 is free to reclaim the memory that was allocated for the descriptor so that it can be reused for other descriptors or for other purposes.

On the other hand, if at step 76 the DMA engine determines that the "next" pointer has a null value, it notes that the current descriptor is the last one in its chain. The engine marks status field 54 accordingly, indicating that the descriptor was "completed as last," at a last descriptor marking step 80. When a descriptor is marked in this manner, the memory management routine will preferably not reclaim the memory that is allocated to the descriptor. The reason for not reclaiming the memory is that the next time the application program submits a new chain of descriptors to engine 22, it will attempt to write the address of the first descriptor in the new chain to "next" field 50 of the last descriptor in the previous chain. If this last descriptor has been erased due to memory management, the DMA engine will not be able to find the new chain. Status field 54 of last descriptor 52 is therefore set to "completed as last" at step 80. This field is preferably changed to read simply "completed" only when the DMA engine has read the first instruction in the new chain and no longer needs the pointer value in the "next field" of last descriptor 52.

When DMA engine 22 has encountered a null "next" pointer at step 76, and flag 32 is still set, the engine rereads the "next" field of last descriptor 52, at a rereading step 82. The reason for rereading this field is to deal with the possibility that CPU 28 modified the field to point to the first descriptor in the new chain after the DMA engine already read the field for the first time (and found a null pointer there). Preferably, even when the DMA engine has already completed the previous chain and is idle when the doorbell is rung, the engine still goes back to read the "next" field of the last descriptor that it executed. As a result, the program used by CPU 28 to prepare and submit descriptor chains is freed completely of the need to check the operational state of the DMA engine or to synchronize itself in any other way with the operation of the DMA engine before submitting the new chain and ringing the doorbell. Rather, the program simply writes the address of the first descriptor in the new chain to the "next" field of the last descriptor in the previous chain, and relies on the novel doorbell mechanism in DMA engine 22 to respond appropriately.

Thus, upon rereading the "next" field of the last descriptor in the previous chain, if engine 22 finds that the field has been modified to a non-null pointer address, it goes on to read and execute the descriptor at the specified address, at step 72. Otherwise, if the pointer value is still null, the engine determines that there are no further descriptors to execute. In this case, flag 32 is reset, thus clearing the doorbell, at a clearing step 86. The DMA engine becomes idle, and waits for its doorbell is rung again, at an idle step 88.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method of direct memory access (DMA), comprising: receiving a first notification at a DMA engine that a first list of descriptors has been prepared, each of the descriptors in the list comprising an instruction for execution by the DMA engine and a link to a succeeding one of the descriptors, except for a final descriptor in the list, which has a null link; reading and executing the descriptors in the first list using the DMA engine; receiving a second notification at the DMA engine that a second list of the descriptors has been prepared; rereading at least a part of only the final descriptor in the first list to determine a changed value of the link, indicating to the DMA engine a first descriptor in the second list; and reading and executing the descriptors in the second list using the DMA engine responsive to the changed value of the link.

2. A method according to claim 1, wherein receiving the first and second notifications comprises receiving the notifications that the first and second lists have been stored at respective addresses in a memory, and wherein reading the descriptors comprises reading the descriptors from the memory.

3. A method according to claim 2, wherein the link in each of the descriptors comprises a pointer to the address of the succeeding one of the descriptors, and wherein receiving the second notification comprises receiving the second notification after the value of the null link has been changed to comprise a pointer to the first descriptor in the second list.

4. A method according to claim 1, wherein receiving the second notification comprises receiving the second notification while the DMA engine is executing the descriptors in the first list, and wherein reading and executing the descriptors in the second list comprises reading and executing the descriptors responsive to the notification after the DMA engine has finished executing the descriptors in the first list.

5. A method according to claim 4, wherein receiving the first notification comprises receiving a first data input to a command register of the DMA engine and setting a flag in response to the first data input, responsive to which flag the DMA engine reads and executes the descriptors, and wherein receiving the second notification comprises leaving the flag set as long as the DMA engine is executing the descriptors.

6. A method according to claim 1, wherein receiving the second notification comprises receiving the second notification after the DMA engine has finished executing the descriptors in the first list, and wherein rereading at least the part of the final descriptor comprises rereading at least the part of the final descriptor after the final descriptor has been executed.

7. A method according to claim 1, wherein reading and executing the descriptors comprises at least one of conveying data from a data source to a memory and conveying data from a memory to a data target.

8. A method according to claim 7, wherein receiving the first and second notifications comprises receiving the notifications submitted by a program running on a central processing unit (CPU), which has prepared the lists of descriptors, while conveying the data comprises transmitting the data using the DMA engine substantially without intervention of the CPU in conveying the data.

9. A method according to claim 8, wherein receiving the second notification comprises receiving the notifications submitted by the program substantially irrespective of an execution state of the DMA engine.

10. A method of direct memory access (DMA), comprising: preparing a first list of descriptors for execution by a DMA engine, each of the descriptors in the list comprising an instruction for execution by the DMA engine and a link to a succeeding one of the descriptors, except for a final descriptor in the list, which has a null link; submitting a first notification to the DMA engine that the first list has been prepared, so that the DMA engine will execute the descriptors in the first list responsive to the first notification; preparing a second list of the descriptors for execution by the DMA engine; modifying the link in the final descriptor in the first list so as to indicate a first descriptor in the second list; submitting a second notification to the DMA engine that the second list has been prepared, so that the DMA engine will execute the descriptors in the second list responsive to the second notification, substantially irrespective of an execution state of the DMA engine when it receives the second notification; wherein submitting the second notification comprises causing the DMA engine to reread at least a portion of only the final descriptor in the first list so as to locate thereby the first descriptor in the second list.

11. A method according to claim 10, wherein preparing the first and second lists comprises storing the lists at respective addresses in a memory, and wherein submitting the first and second notifications comprises notifying the DMA engine that it should read the descriptors from the memory.

12. A method according to claim 11, wherein the link in each of the descriptors comprises a pointer to the address of the succeeding one of the descriptors, and wherein modifying the link comprises changing a value of the null link so as to comprise a pointer to the first descriptor in the second list.

13. A method according to claim 10, wherein submitting the second notification comprises submitting the second notification while the DMA engine is executing the descriptors in the first list.

14. A method according to claim 10, wherein submitting the second notification comprises submitting the second notification after the DMA engine has finished executing the descriptors in the first list.

15. A method according to claim 10, wherein the descriptors comprises at least one of an instruction to the DMA engine to convey data from a data source to a memory and an instruction to the DMA engine to convey data from a memory to a data target.

16. A method according to claim 15, wherein preparing the first and second lists and submitting the first and second notifications comprises preparing the lists and submitting the notifications by means of a program running on a central processing unit (CPU), and wherein the DMA engine conveys the data substantially without intervention of the CPU in conveying the data.

17. Apparatus for direct memory access (DMA), comprising a DMA engine, which is coupled to receive a first notification that a first list of descriptors has been prepared, each of the descriptors in the list comprising an instruction for execution by the DMA engine and a link to a succeeding one of the descriptors, except for a final descriptor in the list, which has a null link, and which is adapted to read and execute the descriptors in the first list, and which is further coupled to receive a second notification a second list of the descriptors has been prepared, and which is further adapted to reread at least a part of only the final descriptor in the first list to determine a changed value of the link, indicating a first descriptor in the second list, and to read and execute the descriptors in the second list using the DMA engine responsive to the changed value of the link.

18. Apparatus according to claim 17, and comprising a memory, which is coupled to store the first and second lists, wherein the first and second notifications comprise notifications that the first and second lists have been stored at respective addresses in a memory, and wherein the DMA engine is coupled to read the descriptors from the memory.

19. Apparatus according to claim 18, wherein the link in each of the descriptors comprises a pointer to the address of the succeeding one of the descriptors, and wherein the changed value of the link in the final descriptor comprises a pointer to the first descriptor in the second list.

20. Apparatus according to claim 17, wherein the DMA engine is adapted to receive the second notification while the DMA engine is executing the descriptors in the first list, and to read and execute the descriptors responsive to the notification after the DMA engine has finished executing the descriptors in the first list.

21. Apparatus according to claim 20, wherein the DMA engine comprises a command register and flag, wherein the first notification comprises a first data input to the command register, and wherein the second notification comprises a second data input to the command register, and wherein the DMA engine is adapted to set the flag in response to the first data input, and to read and execute the descriptors responsive to the flag being set, leaving the flag set as long as the DMA engine is executing the descriptors.

22. Apparatus according to claim 17, wherein the DMA engine is adapted to receive the second notification after the DMA engine has finished executing the descriptors in the first list, and to reread at least the part of the final descriptor in the first list after it has executed the final descriptor.

23. Apparatus according to claim 17, wherein in accordance with the descriptors, the DMA engine performs at least one of conveying data from a data source to a memory and conveying data from a memory to a data target.

24. Apparatus according to claim 23, and comprising a central processing unit (CPU), which is programmed to prepare the first and second lists of descriptors and to submit the first and second notifications, responsive to which the DMA engine is adapted to convey the data substantially without intervention of the CPU in conveying the data.

25. Apparatus according to claim 24, wherein the CPU is programmed to submit the first and second notifications substantially irrespective of an execution state of the DMA engine.

26. Apparatus for direct memory access (DMA), comprising: a DMA engine, adapted to transfer data between a data target and a data source responsive to descriptors submitted thereto; and a descriptor processor, adapted to prepare a first list of the descriptors for execution by the DMA engine, each of the descriptors in the list comprising an instruction for execution by the DMA engine and a link to a succeeding one of the descriptors, except for a final descriptor in the list, which has a null link, and coupled to submit a first notification to the DMA engine that the first list has been prepared, so that the DMA engine will execute the descriptors in the first list responsive to the first notification, and which is further adapted to prepare a second list of the descriptors for execution by the DMA engine and to modify the link in the final descriptor in the first list so as to indicate a first descriptor in the second list, and which is further coupled to submit a second notification to the DMA engine that the second list has been prepared, causing the DMA engine to execute the descriptors in the second list responsive to the second notification, substantially irrespective of an execution state of the DMA engine when it receives the second notification; wherein responsive to the second notification the DMA engine is operative to reread at least a portion of only the final descriptor in the first list so as to locate thereby the first descriptor in the second list.

27. Apparatus according to claim 26, and comprising a memory, wherein the processor is coupled to store the lists at respective addresses in the memory, and to notify the DMA engine that it should read the descriptors from the memory.

28. Apparatus according to claim 27, wherein the link in each of the descriptors comprises a pointer to the address of the succeeding one of the descriptors, and wherein the processor is adapted to change a value of the null link in the final descriptor in the first list so as to comprise a pointer to the first descriptor in the second list.

29. Apparatus according to claim 26, wherein the processor is adapted to submit the second notification, and the DMA engine is capable of receiving the second notification, while the DMA engine is executing the descriptors in the first list.

30. Apparatus according to claim 26, wherein the processor is adapted to submit the second notification, and the DMA engine is capable of receiving the second notification, after the DMA engine has finished executing the descriptors in the first list.

31. Apparatus according to claim 26, wherein the DMA engine is adapted to transfer the data substantially without intervention of the processor in transferring the data.

32. A method of direct memory access (DMA), comprising: receiving a first notification at a DMA engine that a first list of descriptors has been prepared, each of the descriptors in the list comprising an instruction for execution by the DMA engine and a link to a succeeding one of the descriptors, except for a final descriptor in the list, which has a null link; reading and executing the descriptors in the first list using the DMA engine; receiving a second notification at the DMA engine that a second list of the descriptors has been prepared; rereading at least a part of the final descriptor in the first list to determine a changed value of the link, indicating to the DMA engine a first descriptor in the second list; and reading and executing the descriptors in the second list using the DMA engine responsive to the changed value of the link;

wherein receiving the first and second notifications comprises receiving the notifications that the first and second lists have been stored at respective addresses in a memory, and wherein reading the descriptors comprises reading the descriptors from the memory; and wherein executing the descriptors comprises marking each of the descriptors as having been executed after executing each of the descriptors, and wherein marking each of the descriptors comprises marking the final descriptor in a manner that is distinctive from the marking of the other descriptors.

33. A method according to claim 32, and comprising reclaiming the addresses in the memory responsive to the marking of each of the descriptors, so as to permit reallocation of the addresses, while preserving the final descriptor from being reclaimed responsive to its distinctive marking.

34. Apparatus for direct memory access (DMA), comprising a DMA engine, which is coupled to receive a first notification that a first list of descriptors has been prepared, each of the descriptors in the list comprising an instruction for execution by the DMA engine and a link to a succeeding one of the descriptors, except for a final descriptor in the list, which has a null link, and which is adapted to read and execute the descriptors in the first list, and which is further coupled to receive a second notification a second list of the descriptors has been prepared, and which is further adapted to reread at least a part of the final descriptor in the first list to determine a changed value of the link, indicating a first descriptor in the second list, and to read and execute the descriptors in the second list using the DMA engine responsive to the changed value of the link;

the apparatus further comprising a memory, which is coupled to store the first and second lists, wherein the first and second notifications comprise notifications that the first and second lists have been stored at respective addresses in a memory, and wherein the DMA engine is coupled to read the descriptors from the memory; and wherein the DMA engine is adapted to mark each of the descriptors with an indication that the descriptor has been executed, and to mark the final descriptor in a manner that is distinctive from the other descriptors.

35. Apparatus according to claim 34, and comprising a processor, which is coupled to reclaim the addresses of the descriptors in the memory responsive to the indication that the descriptors have been executed, so as to permit reallocation of the addresses, while preserving the final descriptor from being reclaimed responsive to its distinctive indication.

* * * * *